United States Patent
Hanna et al.

(10) Patent No.: US 8,653,960 B2
(45) Date of Patent: Feb. 18, 2014

(54) VEHICLE GAUGE FOR DISPLAYING ELECTRIC MODE STATUS AND METHOD OF DOING THE SAME

(75) Inventors: Ian L. Hanna, Clarkston, MI (US); Jonathan R. Schwarz, Clawson, MI (US); Neal A. Chaperon, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 330 days.

(21) Appl. No.: 13/010,143

(22) Filed: Jan. 20, 2011

(65) Prior Publication Data

US 2012/0188068 A1  Jul. 26, 2012

(51) Int. Cl.
*B60Q 1/00* (2006.01)

(52) U.S. Cl.
USPC ........ 340/441; 340/444; 340/450.2; 340/455; 340/461; 340/464; 340/466

(58) Field of Classification Search
USPC .............. 340/441, 444, 450.2, 455, 461, 464, 340/466
See application file for complete search history.

(56) References Cited

U.S. PATENT DOCUMENTS

| | | | | |
|---|---|---|---|---|
| 4,690,117 A | * | 9/1987 | Isobe et al. | 123/492 |
| 4,933,852 A | * | 6/1990 | Lemelson | 701/29.4 |
| 5,789,881 A | * | 8/1998 | Egami et al. | 318/139 |
| 6,013,992 A | * | 1/2000 | Ishikawa et al. | 318/376 |
| 6,124,690 A | * | 9/2000 | Yano et al. | 318/376 |
| 6,278,915 B1 | * | 8/2001 | Deguchi et al. | 701/22 |
| 6,295,487 B1 | * | 9/2001 | Ono et al. | 701/22 |
| 6,352,489 B1 | * | 3/2002 | Kuroda et al. | 477/5 |
| 6,574,546 B2 | * | 6/2003 | Nada | 701/110 |
| 7,053,566 B2 | * | 5/2006 | Aizawa et al. | 318/34 |
| 7,117,071 B2 | * | 10/2006 | Aoki et al. | 701/22 |
| 7,146,958 B2 | * | 12/2006 | Asakawa et al. | 123/179.16 |
| 7,222,019 B2 | * | 5/2007 | Kido et al. | 701/29.1 |
| 7,646,289 B2 | * | 1/2010 | Tamai et al. | 340/439 |
| 7,762,926 B2 | * | 7/2010 | Peterson | 477/172 |
| 7,832,512 B2 | * | 11/2010 | Watanabe et al. | 180/65.28 |
| 7,893,822 B2 | * | 2/2011 | Gerber | 340/463 |
| 7,957,855 B2 | * | 6/2011 | Seo et al. | 701/22 |
| 8,207,841 B2 | * | 6/2012 | Watson et al. | 340/462 |
| 8,249,770 B2 | * | 8/2012 | Bennewitz | 701/29.2 |
| 8,289,143 B2 | * | 10/2012 | Mizutani et al. | 340/438 |
| 2001/0039939 A1 | * | 11/2001 | Nada | 123/399 |

(Continued)

FOREIGN PATENT DOCUMENTS

| | | | | |
|---|---|---|---|---|
| DE | 19914111 A1 | * | 9/2000 | E05B 65/36 |
| DE | 10310233 A1 | * | 9/2004 | B60K 35/00 |

(Continued)

*Primary Examiner* — George Bugg
*Assistant Examiner* — Paul Obiniyi
(74) *Attorney, Agent, or Firm* — Lionel D. Anderson; Reising Ethington P.C.

(57) ABSTRACT

A vehicle gauge and method for displaying an electric mode status of a vehicle that can operate in both an electric mode and one or more alternative modes. According to one exemplary embodiment, the method evaluates a number of throttle and non-throttle conditions and allocates portions of the total range of the vehicle gauge to these conditions. Based on these allocations, the method determines an overall vehicle gauge position that is representative of the electric mode status of the vehicle and provides this to the vehicle gauge so that the electric mode status can be displayed to the driver.

17 Claims, 4 Drawing Sheets

(56) References Cited

U.S. PATENT DOCUMENTS

| | | | |
|---|---|---|---|
| 2002/0171541 A1* | 11/2002 | Crombez et al. | 340/461 |
| 2002/0185086 A1* | 12/2002 | Newman et al. | 123/1 A |
| 2002/0195288 A1* | 12/2002 | Komiyama et al. | 180/65.4 |
| 2005/0000481 A1* | 1/2005 | Asakawa et al. | 123/179.16 |
| 2005/0200463 A1* | 9/2005 | Situ et al. | 340/438 |
| 2006/0287806 A1* | 12/2006 | Hori | 701/114 |
| 2007/0175681 A1* | 8/2007 | King et al. | 180/65.4 |
| 2008/0051950 A1* | 2/2008 | Seo et al. | 701/22 |
| 2008/0153669 A1* | 6/2008 | Peterson | 477/197 |
| 2008/0243322 A1* | 10/2008 | Nobumoto et al. | 701/22 |
| 2008/0246423 A1* | 10/2008 | Takeuchi | 318/376 |
| 2009/0040032 A1* | 2/2009 | Gerber | 340/438 |
| 2010/0076664 A1* | 3/2010 | Monros | 701/102 |
| 2010/0094498 A1* | 4/2010 | Watanabe et al. | 701/22 |
| 2010/0102945 A1* | 4/2010 | Watson et al. | 340/462 |
| 2010/0107811 A1* | 5/2010 | McCloy | 74/665 F |
| 2010/0180872 A1* | 7/2010 | Monros | 123/573 |
| 2010/0194553 A1* | 8/2010 | Mizutani et al. | 340/438 |
| 2010/0265050 A1 | 10/2010 | Skaff et al. | |
| 2010/0282210 A1* | 11/2010 | Itagaki | 123/399 |
| 2012/0091835 A1* | 4/2012 | Kim et al. | 310/54 |
| 2012/0197473 A1* | 8/2012 | Kshatriya | 701/22 |

FOREIGN PATENT DOCUMENTS

| | | | | |
|---|---|---|---|---|
| JP | 63011432 A | * | 1/1988 | B60K 17/35 |
| JP | 07315078 A | * | 12/1995 | B60K 37/02 |
| JP | 2000025490 A | * | 1/2000 | B60K 41/12 |
| JP | 2010185824 A | * | 8/2010 | |

* cited by examiner

US 8,653,960 B2

VEHICLE GAUGE FOR DISPLAYING ELECTRIC MODE STATUS AND METHOD OF DOING THE SAME

TECHNICAL FIELD

The present invention generally relates to vehicle gauges and, more particularly, to vehicle gauges that may be used with vehicles, like hybrid electric vehicles (HEVs), that can operate in an electric mode.

BACKGROUND

When driving a hybrid electric vehicle (HEV) or the like, a driver may be curious as to how much they can engage an accelerator pedal before the vehicle transitions from an electric mode to some alternative mode. For example, the driver may want to know, based on the current operating conditions, how close the vehicle is to an engine start event that causes the vehicle to go from an electric mode to an engine mode. By knowing this, the driver may be able to maintain the vehicle in an electric mode for a longer period of time and thereby increase the fuel efficiency of the vehicle. Other reasons may also exist for displaying or presenting this information to a driver.

SUMMARY

According to one embodiment, there is provided a method of displaying an electric mode status of a vehicle. The method may comprise the steps of: (a) receiving a non-throttle sensor reading from a non-throttle sensor and using the non-throttle sensor reading to determine a first gauge allocation for a vehicle gauge; (b) receiving a throttle sensor reading from a throttle sensor and using the throttle sensor reading to determine a second gauge allocation for the vehicle gauge; (c) using the first and second gauge allocations to determine the electric mode status of the vehicle; and (d) displaying the electric mode status of the vehicle with the vehicle gauge, wherein the vehicle can operate in an electric mode and at least one alternative mode of operation.

According to another embodiment, there is provided a method of displaying an electric mode status of a vehicle. The method may comprise the steps of: (a) receiving a battery sensor reading from a battery sensor that is coupled to a high-voltage battery used for vehicle propulsion and using the battery sensor reading to determine a first gauge allocation for the vehicle gauge, wherein the first gauge allocation is influenced by the amount of charge on the high-voltage battery; (b) receiving a throttle sensor reading from a throttle sensor that is coupled to an accelerator pedal and using the throttle sensor reading to determine a second gauge allocation for the vehicle gauge, wherein the second gauge allocation is influenced by the amount of torque requested by the driver; (c) adding the first and second gauge allocations together to determine a total gauge allocation, wherein the total gauge allocation generally indicates how close the vehicle is to transitioning from an electric mode to an engine mode; and (d) controlling the vehicle gauge with a command signal that is generated using the total gauge allocation.

According to another embodiment, there is provided a vehicle gauge for displaying an electric mode status of a vehicle. The vehicle gauge may comprise: a first end representing the beginning of an electric mode range; a second end representing the end of the electric mode range and the beginning of an alternative mode of operation; a total range extending from the first end to the second end; and an indicator moving between the first end and the second end along the total range, wherein the position of the indicator indicates the electric mode status of the vehicle.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The vehicle gauge and corresponding method described below may be used to display an electric mode status of a vehicle that can operate in both an electric mode and one or more alternative modes. Examples of such vehicles may include a hybrid electric vehicle (HEV), a plug-in hybrid electric vehicle (PHEV), an extended range electric vehicle (EREV), or any other vehicle that can transition between an electric mode and one or more alternative modes of operation. According to one exemplary embodiment, the method evaluates both throttle and non-throttle conditions and assigns certain gauge allocations accordingly. Based on these allocations, the method then determines an overall gauge position that is representative of the electric mode status of the vehicle, and provides this to the vehicle gauge so that the electric mode status can be displayed to the driver. In some ways, the vehicle gauge and the electric mode status that it illustrates are akin to a fuel gauge and a corresponding fuel level. However, instead of informing the driver when the vehicle is likely to run out of fuel, it informs the driver when the vehicle is likely to transition from an electric mode to an alternative mode (e.g., via a non-customer actuated engine start event).

Figure 1:
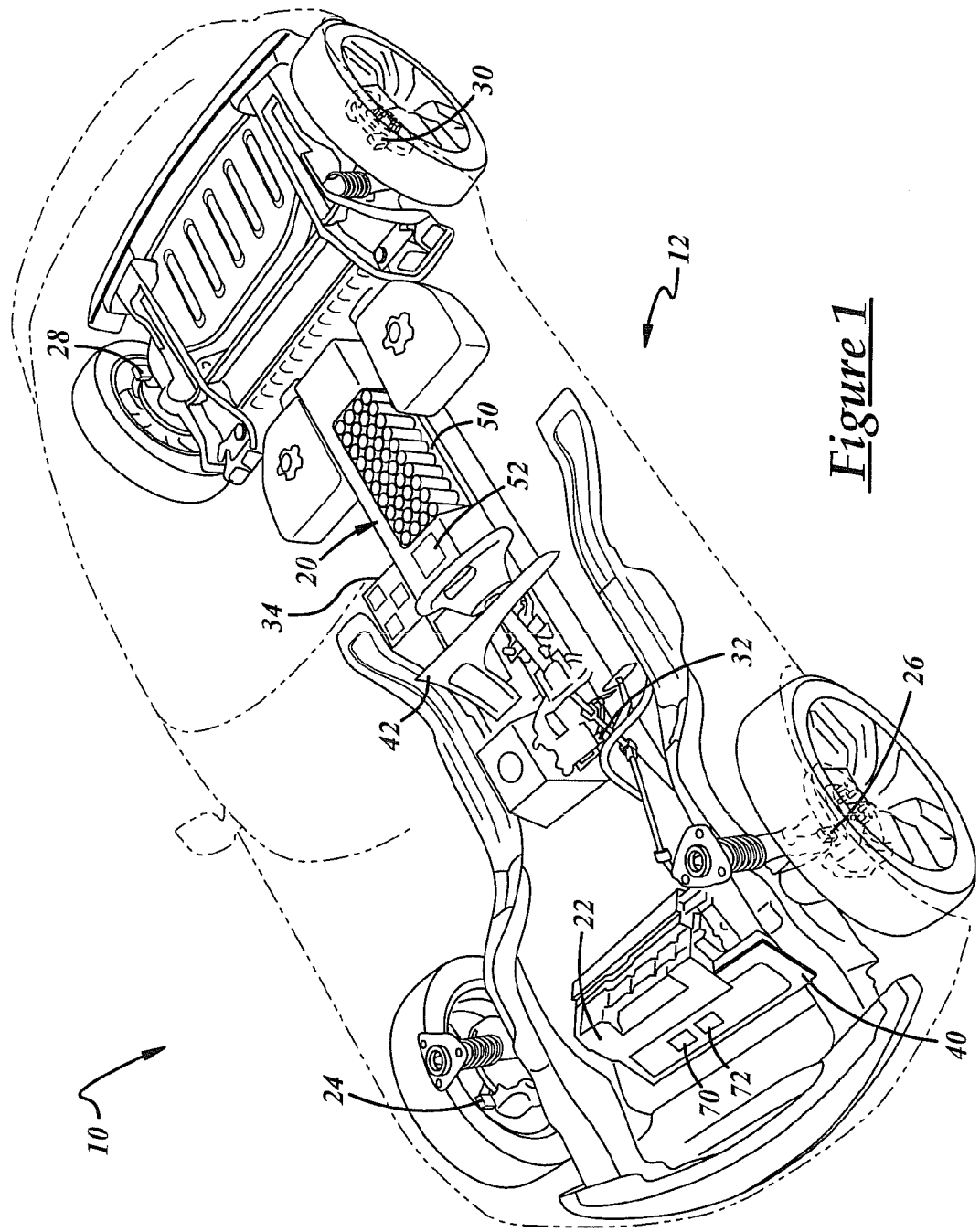
FIG. 1 is a schematic view of an exemplary hybrid electric vehicle (HEV) that may operate in an electric mode and an alternative mode.

With reference to FIG. 1, there are shown portions of an exemplary vehicle 10 that may run in several different operating modes, including an electric mode where the vehicle is propelled using electrical energy stored in a battery and an alternative mode where the vehicle uses an internal combustion engine. It should be appreciated that FIG. 1 is only a schematic representation of certain portions of a vehicle and that the vehicle gauge and method described herein could be used with any number of different vehicles and is not limited to the exemplary one shown here. As mentioned above, the present method may be used with a hybrid electric vehicle (HEV), a plug-in hybrid electric vehicle (PHEV), an extended-range electric vehicle (EREV), or any other vehicle that can transition between different modes of operation. According to this particular embodiment, vehicle 10 generally includes a battery 20, an engine 22, speed sensors 24-30, a throttle sensor 32, a sensor unit 34, a control module 40, and a vehicle gauge 42.

Vehicle battery 20 provides electrical energy for vehicle propulsion and, depending on the particular embodiment, may be the primary vehicle power source or may be used in conjunction with another power source. Vehicle battery 20 may include a high-voltage battery pack 50 as well as a variety of battery sensors 52. Battery pack 50 includes a collection of individual battery cells that are connected in series, parallel, or a combination of both in order to deliver a desired voltage, amperage, capacity, power density, and/or other performance characteristics. Generally, it is desirable for battery pack 50 to provide high power and energy densities, which has led to the development and use of many types of batteries including chemical, non chemical, and others. Some examples of suitable battery types that may be used by battery pack 50 include: all types of lithium-ion (e.g., lithium iron phosphate, lithium nickel manganese cobalt, lithium iron sulfide, lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. Battery pack 50 may provide approximately 40-600V, depending on its particular design and application. For example, a heavy truck using a two-mode hybrid system may require a high-voltage battery pack capable of providing about 350V, where a lighter vehicle may only need about 200V. In another embodiment, battery 20 may be part of a belt-alternator-starter (BAS) or BAS-plus type system and thus only require a battery pack that provides about 40-110V. In any case, battery pack 50 should be designed to withstand repeated charge and discharge cycles. Skilled artisans will appreciate that the vehicle gauge and method described herein are not limited to any one particular type of battery or battery arrangement, as a number of different battery embodiments could be used.

Battery sensors 52 may include any combination of hardware and/or software components capable of monitoring, sensing or otherwise determining battery conditions such as temperature, voltage, current, state-of-charge (SOC), state-of-health (SOH), etc. According to one exemplary embodiment, battery sensors 52 include a battery temperature sensor, a battery voltage sensor, a battery current sensor and/or a battery SOC sensor. Battery sensors 52 may be integrated within battery pack 50 (e.g., an intelligent or smart battery), they may be external sensors located outside of the battery pack (as schematically shown in FIG. 1), or they may be provided according to some other arrangement. Battery sensors 52 may monitor, sense or otherwise determine battery conditions for one or more individual cells, for a collection or block of cells within battery pack 50 (i.e., a subset of the overall collection of cells), for the entire battery pack, or according to some other method known in the art. According to one embodiment, battery sensors 52 provide battery readings for battery pack 50 on an overall or pack basis (e.g., an overall battery temperature, battery voltage, battery current, battery SOC for the entire battery pack). This is, of course, only one possibility, as the battery readings may be provided according to other techniques as well. Battery sensors 52 may employ any type of suitable technique or method for measurement, estimation, evaluation, averaging, etc.; this includes both directly and indirectly determining battery conditions. Output from battery sensors 52 may be provided to control module 40 or some other appropriate device in the form of battery readings via a suitable vehicle communications connection (e.g., a CAN bus, a SPI connection, etc.).

Engine 22 may propel the vehicle using conventional internal combustion techniques and/or drive a generator, and may include any suitable type of engine known in the art. Some examples of suitable engines include gasoline, diesel, ethanol, flex-fuel, natural gas, liquefied petroleum gas (LPG), hydrogen, naturally aspirated, turbo-charged, super-charged, rotary, Otto-cycle, Atkins-cycle and Miller-cycle engines, as well as others. According to one embodiment, engine 22 is a small fuel-efficient engine (e.g., a small displacement, turbo-charged four-cylinder engine) that receives fuel from a fuel tank and uses the mechanical output of the engine to turn a generator that is coupled to battery 20. Skilled artisans will appreciate that engine 22 may be provided according to any number of different embodiments, may be connected in any number of different configurations (e.g., the engine could be part of a parallel hybrid system where the engine is mechanically coupled to the vehicle wheels, or part of a serial hybrid system where the engine is mechanically coupled to an electric generator that supplies battery 20 with charge), and may include any number of different components and devices. Because the present method is not tied to any particular type of engine and because of the widespread knowledge in the art concerning such engines, a further explanation of exemplary engine 22 is omitted. It is also possible for the vehicle to have a fuel cell stack or some other source of electrical energy generation that is used in lieu of or in addition to an internal combustion engine and/or a battery pack for purposes of vehicle propulsion.

Speed sensors 24-30 provide speed sensor readings that are generally representative of the speed or velocity of the vehicle. A variety of different speed sensors and sensing techniques may be used, including those that use rotational wheel speed, ground speed, accelerator pedal position, clutch pedal position, gear shifter selection, vehicle acceleration, engine speed, engine torque, and throttle valve position, to name a few. In one embodiment, individual wheel speed sensors 24-30 are coupled to each of the vehicle's four wheels and separately report the rotational velocity of the four wheels. Skilled artisans will appreciate that these sensors may operate according to optical, electromagnetic or other technologies, and that vehicle speed sensors 24-30 are not limited to any particular speed sensor type. In another embodiment, speed sensors could be coupled to certain parts of the vehicle, such as an output shaft of the transmission or behind the speedometer, and produce speed sensor readings from these measurements. It is also possible to derive or calculate speed sensor readings from acceleration readings, such as those mentioned herein (skilled artisans appreciate the relationship between velocity and acceleration readings). In another embodiment, one or more speed sensors could determine vehicle speed relative to the ground by directing radar, laser or other signals towards the ground and analyzing the reflected signals, or by employing feedback from a Global Positioning System (GPS). It is also possible for speed sensors 24-30 to provide the speed sensor readings indirectly via some other device, module, sub-system, system, etc., like an engine control module (ECM), instead of providing the speed sensor readings directly.

Throttle sensor 32 provides a throttle sensor reading that is generally representative of the amount of torque that is being requested by the driver or by some component, device, module, system, etc. in the vehicle. Numerous types of throttle sensors and sensing arrangements are known in the art and could be used in vehicle 10. According to an exemplary embodiment, throttle sensor 32 is coupled to an accelerator pedal and provides a throttle sensor reading that is generally representative of the position, movement and/or state of the accelerator pedal. Skilled artisans will appreciate that a number of different types of throttle sensors could be used to sense an accelerator pedal; these include non-contact-type sensors (e.g., optical sensors, electro-magnetic sensors, etc.), as well as contact-type sensors (e.g., potentiometers, contact switches, etc.). In an exemplary embodiment, throttle sensor 32 includes a non-contact-type sensor with a Hall-Effect element that is electromagnetically coupled to the accelerator pedal so that it can determine the current position, movement and/or state of the accelerator pedal.

It is not necessary that throttle sensor 32 be coupled to an accelerator pedal, so long as the throttle sensor provides some information regarding the amount of torque being requested by the driver or some component, device, module, system, etc. in the vehicle. For example, it is possible for throttle sensor 32 to obtain information regarding requested torque from one or more vehicle speed sensors, acceleration sensors (e.g., longitudinal, lateral, etc.), and yaw rate sensors, to name a few. It is also possible for throttle sensor 32 to obtain information regarding requested torque from one or more sensors coupled to input and/or output shafts in the vehicle drivetrain, to an actual throttle valve, or to some other component or device in the vehicle.

Sensor unit 34 provides one or more sensor readings, such as temperature sensor readings, that can be representative of various conditions around the vehicle. For example, sensor unit 34 may include an engine temperature sensor (e.g., one that measures coolant, oil or some other engine-related temperature), a transmission temperature sensor (e.g., one that measures transmission fluid or some other transmission-related temperature), and/or a device temperature sensor (e.g., one that measures the temperature of certain components and devices, like electric motors used for vehicle propulsion or inverters used in a hybrid vehicle drivetrain, to name but a few). Skilled artisans will recognize that sensor unit 34 is not exclusively limited to temperature sensors, and may include other sensors as well. Any sensor that senses or measures a non-throttle condition that can affect the electric mode status of the vehicle may be included within sensor unit 34. Furthermore, it is not necessary for sensor unit 34 to be a separate stand-alone unit (as schematically shown in FIG. 1), as the constituent sensors may be integrated within or mounted to some other component, device, module, system, etc. in the vehicle. For instance, an engine temperature sensor that is part of sensor unit 34 would likely be mounted to the engine and not located at a remote location, as schematically illustrated in FIG. 1. Output from sensor unit 34 may be provided to control module 40 or to some other device in the form of readings via a suitable communications connection (e.g., a CAN bus, a SPI connection, etc.). The method described herein may use speed sensor readings from speed sensors 24-30, throttle sensor readings from throttle sensor 32 and/or temperature sensor readings from sensor unit 34 to determine an electric mode status of vehicle 10, as will be explained. No particular type of sensor or sensor arrangement, specific technique for gathering or processing sensor readings, or particular method for providing sensor readings is required for the present method, as the preceding embodiments are simply meant to be exemplary.

Control module 40 may include any variety of electronic processing devices, memory devices, input/output (I/O) devices, and/or other known components, and may perform various control and/or communication related functions. In an exemplary embodiment, control module 40 includes an electronic memory device 70 that stores various sensor readings (e.g., battery, speed, throttle and/or temperature sensor readings), look up tables or other data structures, algorithms, etc. Memory device 70 may also store pertinent characteristics and background information pertaining to battery state-of-charge (SOC) limits, battery voltage limits, battery current limits, battery temperature limits, temperature profiles, etc. In the exemplary embodiment shown in FIG. 1, control module 40 also includes an electronic processing device 72 (e.g., a microprocessor, a microcontroller, an application specific integrated circuit (ASIC), etc.) that executes instructions for software, firmware, programs, algorithms, scripts, etc. that are stored in memory device 70 and may govern the processes and methods described herein. Control module 40 may be electronically connected to other vehicle devices and modules via a suitable vehicle communications connection and can interact with them when required. These are, of course, only some of the possible arrangements, functions and capabilities of control module 40, as other embodiments could also be used.

Depending on the particular embodiment, control module 40 may be a stand-alone vehicle electronic module (e.g., a vehicle control integrated module (VCIM), a traction power inverter module (TPIM), a battery power inverter module (BPIM), part of an instrument cluster itself, a hybrid control module, an engine control module (ECM), etc.), it may incorporated or included within another vehicle electronic module (e.g., a power train control module or a hybrid control module), or it may be part of a larger network or system (e.g., a battery management system (BMS), a vehicle energy management system, a hybrid control system, etc.), to name a few possibilities. Control module 40 may also be part of or interact with a system that determines a desired hybrid operating mode (e.g., accelerating, braking, idling, stopping, etc.) and may implement electrical power management actions accordingly.

Vehicle gauge 42 displays or otherwise demonstrates an electric mode status of the driver of vehicle 10. Any number of different gauges or other pieces of instrumentation may be used, including various types of analog and digital gauges known in the art. The type of gauge used may vary depending on the particular vehicle application; for instance, size restrictions, lighting requirements, power supply, driving environment (highway, city, cold weather, hot weather, etc.) and/or cosmetic considerations may all affect the design of the vehicle gauge. It is also possible for vehicle gauge 42 to be part of a larger user interface, such as those that are used in an instrument panel or infotainment center and include features like touch-screen displays, pushbuttons or other vehicle controls, keyboards, microphones (e.g., where input is verbally provided and interpreted by a human-machine interface (HMI)), to cite a few examples. In one exemplary embodiment, gauge 42 includes a portion or segment that is dedicated to displaying electric mode status, and another portion or segment that is dedicated to displaying the engine mode status, like a traditional tachometer. The method described herein can be used with any suitable gauge and/or user interface, and is not limited to the exemplary one shown in the drawing and described below.

Figure 2:
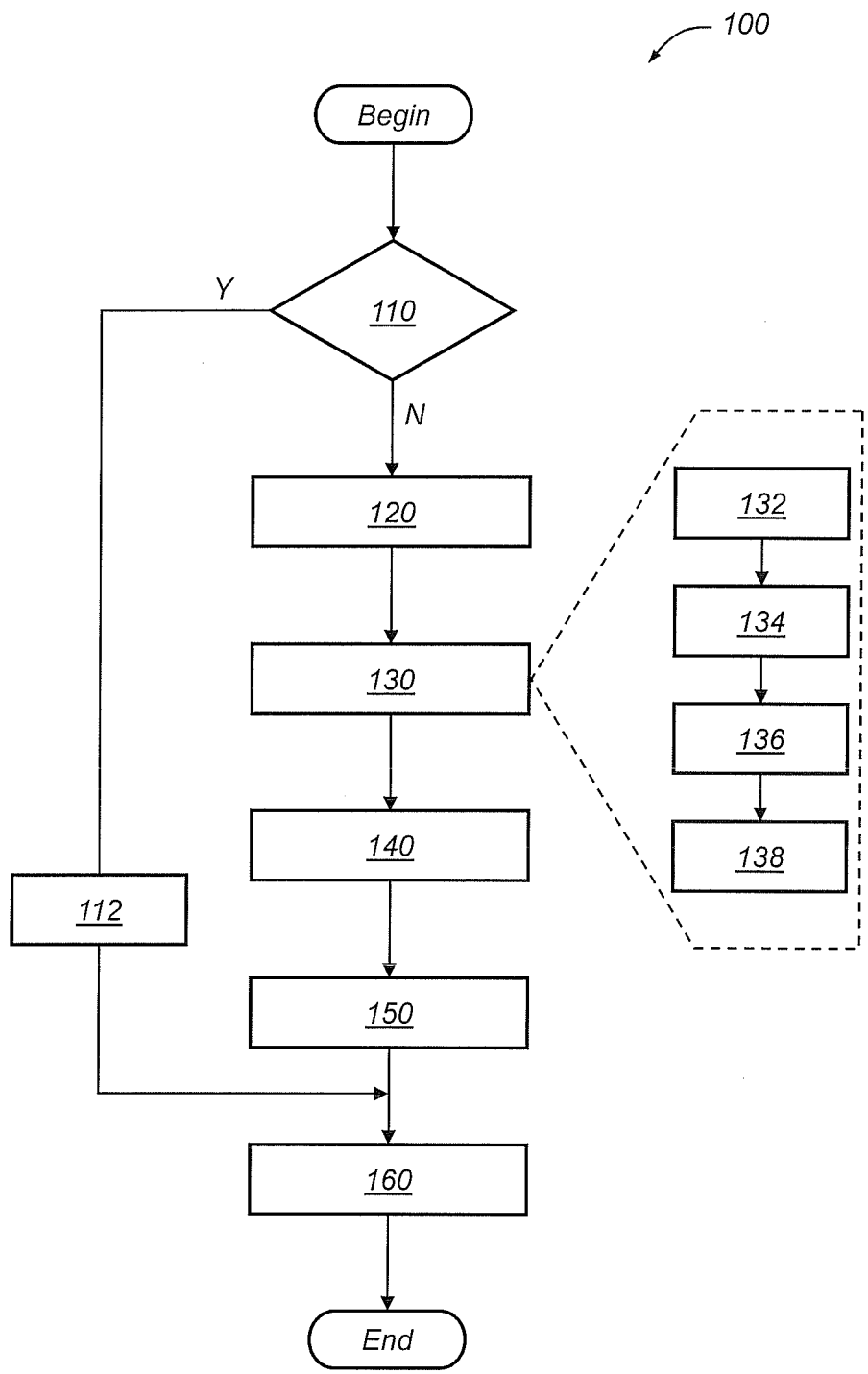
FIG. 2 is a flowchart illustrating an exemplary method for displaying an electric mode status of a vehicle, such as the hybrid electric vehicle (HEV) of FIG. 1.

Turning now to FIG. 2, there is shown an exemplary embodiment of a method 100 for displaying an electric mode status of a vehicle that can operate in both an electric mode and an alternative mode, such as vehicle 10. Beginning with step 110, the method first determines if engine 22 is running or is otherwise being operated. If the engine is already running, then the vehicle is probably not in an electric mode and method 100 may bypass the remaining steps which are designed to display an electric mode status to a driver. In one embodiment, control module 40 determines if engine 22 is running by receiving an engine status signal from an engine control module or other device that knows the operational status of the engine. The engine status signal can be sent by the engine control module upon start up, in response to a request from control module 40, periodically according to some predetermined frequency, or according to some other arrangement. Skilled artisans will recognize that components, devices, modules, systems, etc. other than an engine control module may send an engine status signal to control module 40.

If the engine is running (i.e., the vehicle is already in an engine mode), then method 100 proceeds to step 112 where the speed of the engine (e.g., in RPMs) is determined so that it can be displayed to the driver. In one example, the speed of the engine is conveyed to the driver via vehicle gauge 42 which is able to display both an electric mode status and an engine mode status (e.g., in the form of a modified tachometer). This will be subsequently explained in greater detail. Any number of known techniques for determining engine speed may be employed in this step, which is optional. If the engine is not running (thus, suggesting that the vehicle is in an electric mode or some other alternative mode), then the method proceeds to step 120.

Before describing step 120, it may be helpful to provide some explanation regarding the electric mode status of the vehicle. There are a number of different demands on the vehicle that can affect the electric mode status of the vehicle; see the exemplary vehicle gauge 42 in FIG. 5 for an illustration of this concept. The total angular range 202 of the vehicle gauge represents the total electric mode range of the vehicle. If the indicator 204 is at or near a first end 210 of the range, then the vehicle is operating well within the electric mode and it is not close to transitioning to an alternative mode, such as an engine mode. If indicator 204 is at or near a second end 212 of the range, then the vehicle is operating at a point that is much closer to transitioning from an electric mode to an alternative mode. In the case of a vehicle that can operate in both electric and engine modes, for example, the transition threshold between modes exists at second end 212 which marks the end of the electric mode and the beginning of an alternative mode (this transition threshold could involve a non-customer actuated engine start).

Those skilled in the art will appreciate that a number of different vehicle demands and conditions (e.g., non-throttle and throttle conditions) can impact the electric mode status of the vehicle. For example, if battery 20 is already in a relatively depleted state (e.g., it has a low state-of-charge (SOC)), then this would encourage vehicle gauge 42 towards second end 212 because the vehicle may soon have to transition to an engine mode in order to recharge the battery. If, on the other hand, the vehicle is coasting down a hill at a low speed and the driver is not engaging the accelerator pedal (i.e., the driver is not requesting any torque), then this would typically encourage vehicle gauge 42 towards first end 210 because the acceleration-related demands on the vehicle are somewhat low. The preceding examples are only some of the potential demands or conditions that may affect the electric mode status of the vehicle, as many others also exist. In a sense, vehicle gauge 42 displays the electric mode status of the vehicle so that the driver may know how close the vehicle is to exiting an electric mode in favor of an engine mode. It should be appreciated that vehicle gauge 42 is merely exemplary and that other vehicle gauges with different designs and configurations may be used instead.

Turning now to step 120, the method receives a non-throttle sensor reading from a non-throttle sensor and uses the non-throttle sensor reading to determine a first gauge allocation for vehicle gauge 42. The term "non-throttle sensor reading," as used herein, broadly includes any sensor reading in the vehicle that is provided by a non-throttle sensor and can impact the electric mode status of the vehicle. For example, any of the sensor readings from speed sensors 24-30, sensor unit 34 or battery sensors 52 may constitute a non-throttle sensor reading, as well as sensor readings from other devices, modules, sub-systems and systems in the vehicle, like an engine control module or a hybrid control module. The sensor readings that are gathered and used in this step are representative of conditions within the vehicle or demands upon the vehicle that can impact the electrode mode status. Thus, step 120 evaluates these non-throttle sensor readings and determines how much of the total electric mode range should be allocated to them. As stated above, step 120 may gather and use one or more non-throttle sensor readings, including speed sensor readings, battery sensor readings and/or temperature sensor readings, to cite a few possibilities.

Figure 3:
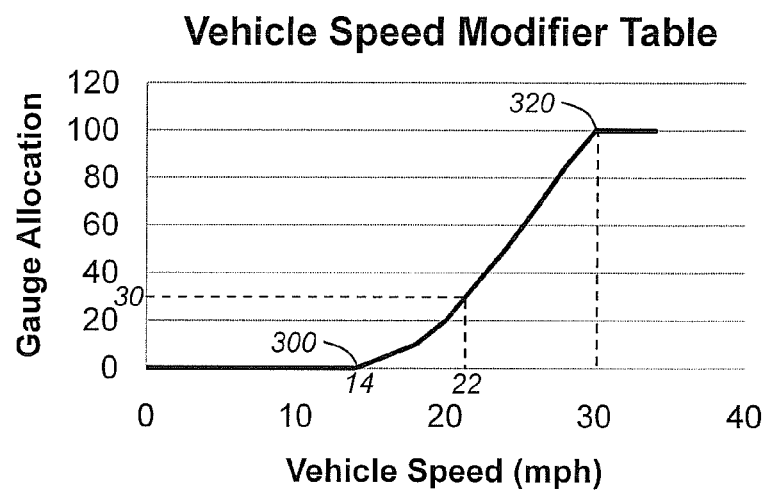
FIG. 3 is a graph illustrating an exemplary relationship between gauge allocation and vehicle speed, and may be used in conjunction with the method shown in FIG. 2.

Consider the example where step 120 receives non-throttle sensor readings in the form of speed sensor readings; that is, readings that are representative of the speed or velocity of the vehicle. According to one exemplary embodiment, one or more of the speed sensors 24-30 provide speed sensor readings to control module 40. Even though vehicle speed can certainly be affected by the state of the throttle, speed sensor readings are considered non-throttle sensor readings in the present case. If the vehicle is traveling at a high speed when it is in an electric mode, this may encourage or push the vehicle closer to an engine mode. Turning to the graph in FIG. 3, there is shown an exemplary relationship between gauge allocation and vehicle speed where, generally speaking, the faster the vehicle is travelling the more gauge allocation is required. In FIG. 3, gauge allocation (%) is represented on the y-axis and vehicle speed (mph) represented on the x-axis. Some hybrid electric vehicles (HEVs) may have a minimum speed threshold 300 (e.g., 14 mph), below which there is very little demand on the vehicle that impacts the electric mode (i.e., 0% gauge allocation because the vehicle speed is so low). Likewise, these vehicles may have a maximum speed threshold 320 (e.g., 30 mph), above which there is significant demand on the vehicle that impacts the electric mode (i.e., 100% gauge allocation because the vehicle speed is so high). Thus, when the vehicle speed reaches or exceeds maximum speed threshold 320, the engine automatically turns on and the vehicle transitions to an engine mode regardless of the other vehicle conditions.

To illustrate, assume that the current vehicle speed is 22 mph. Using the graph in FIG. 3, a vehicle speed of 22 mph correlates to a gauge allocation of 30%, which is demonstrated in FIG. 5 by arrow 220. If the vehicle speed was higher than 22 mph, then indicator 204 would be at a position that is greater than arrow 220 in the clockwise direction; if the vehicle speed was lower than 22 mph, then the indicator would be at a position that is less than arrow 220 in the clockwise direction; and if the vehicle speed was greater than maximum speed threshold 320, then the indicator would move all the way to second end 212. It should be appreciated that the graph in FIG. 3 does not need to be that exact shape, as it could be linear, exponential or some other shape. Moreover, the relationships illustrated in FIG. 3 may be determined with lookup tables, mathematical equations, formulas, etc., or by any other means. These relationships may be static or dynamic, and can be developed through research and testing, to cite a few possibilities.

Figure 4:
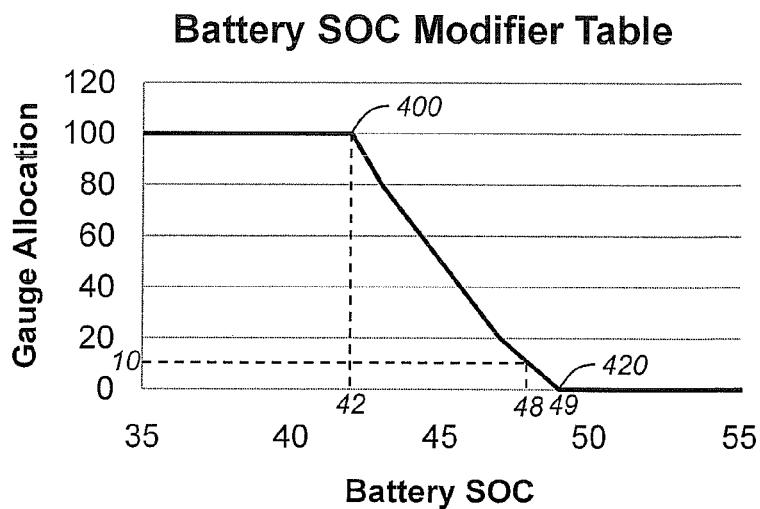
FIG. 4 is a graph illustrating an exemplary relationship between gauge allocation and state-of-charge (SOC) of the battery, and may be used in conjunction with the method shown in FIG. 2.

Now consider the example where step 120 receives non-throttle sensor readings in the form of battery sensor readings; that is, readings that are representative of one or more battery conditions like voltage, current, state-of-charge (SOC), stateof-health (SOH), temperature, etc. According to one exemplary embodiment, one or more battery sensors 52 provide the battery sensor readings to control module 40. If the battery SOC is at a low state when the vehicle is in an electric mode, then this may encourage or push the electric mode status closer to an engine where the battery can be replenished. Turning to the graph in FIG. 4, there is shown an exemplary relationship between gauge allocation and battery SOC where, generally speaking, the lower the battery SOC the more gauge allocation is required. In FIG. 4, gauge allocation (%) is represented on the y-axis and vehicle speed (mph) is represented on the x-axis. Like the vehicle speed graph in FIG. 3, the battery SOC graph also has minimum and maximums. If the battery SOC is below a minimum SOC threshold 400 (e.g., 42% SOC), then there is so little charge on the battery that it causes the vehicle to automatically transition from an electric mode to an engine mode (i.e., 100% gauge allocation because the battery SOC is so low). When the battery SOC is at or below minimum SOC threshold 400, the engine automatically turns on and the vehicle transitions to an engine mode regardless of the other vehicle conditions. If the battery SOC is above maximum SOC threshold 420 (e.g., 49% SOC), then there is plenty of charge on the battery and no gauge allocation is required for this condition.

Figure 5:
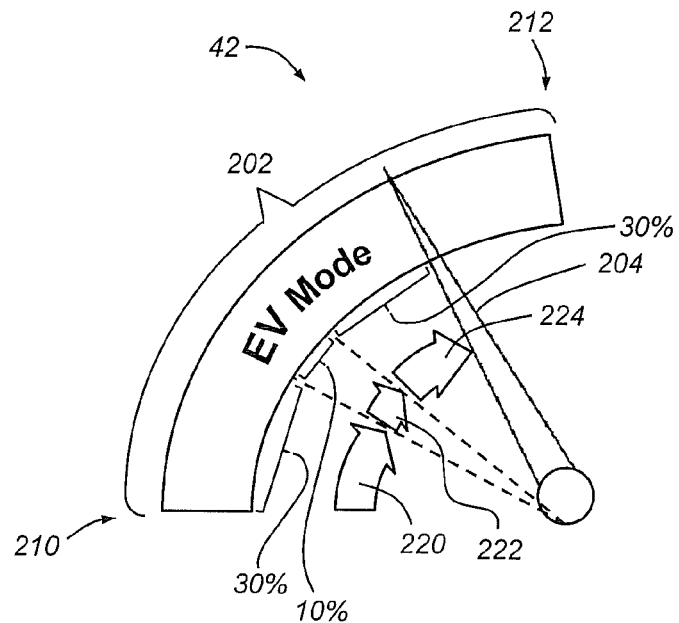
FIGS. 5-7 are graphical representations of several exemplary vehicle gauges that may be used to display an electric mode status of a vehicle, such as the hybrid electric vehicle (HEV) of FIG. 1.

In the exemplary case, the battery SOC is 48% which corresponds to a gauge allocation of 10% and is represented in FIG. 5 by arrow 222. If the battery SOC was higher, then indicator 204 would be at a position that is less than arrow 222 in the clockwise direction; if the battery SOC was lower, then the indicator would be at a position that is more than arrow 222 in the clockwise direction. Skilled artisans will appreciate that it may be desirable to maintain battery 20 in a certain SOC range in order to preserve the lifespan or improve the performance of the battery, and that the values and shape of exemplary graph shown in FIG. 4 can vary for different batteries and battery-types. Moreover, the relationships illustrated in FIG. 4 may be determined with lookup tables, mathematical equations, formulas, etc., or by any other means. These relationships may be static or dynamic, and can be developed through research and testing, to cite a few possibilities. It is not necessary for the battery sensor readings to be in the form of state-of-charge (SOC), as they could also be presented in the form of voltage, current, state-of-health (SOH), battery temperature, etc.

Other examples of non-throttle sensor readings may include battery temperature, auxiliary pump temperature, electric motor temperature, engine temperature, transmission temperature, inverter temperature, any other non-throttle sensor readings that may impact the electric mode status of the vehicle, or some combination thereof. Each of these non-throttle sensor readings may have their own look-up tables that, like the graphs illustrated in FIGS. 3 and 4, correlate that particular non-throttle sensor reading to a gauge allocation. It is also possible for two or more non-throttle sensor readings to be combined or integrated with one another, and for the combined readings to then be assigned a gauge allocation. Once all of the non-throttle sensor readings in question have been received, gathered or otherwise obtained and their corresponding gauge allocations have been determined, step 120 can add or sum these gauge allocations together to determine an overall non-throttle gauge allocation for the vehicle. With reference to the exemplary vehicle gauge 42 shown in FIG. 5, step 120 determines that the total non-throttle gauge allocation is 40% (30% from vehicle speed plus 10% from battery SOC). If there were any other non-throttle sensor readings that were assigned a gauge allocation (e.g., various temperature readings), then they would be added to this total as well.

Because various vehicle conditions may impact the electric mode status to different degrees, weighting for each of these non-throttle sensor readings may be taken into account via the individual look-up tables or according to some other technique.

Step 130 receives a throttle sensor reading from a throttle sensor and uses the throttle sensor reading to determine a second gauge allocation for vehicle gauge 42. The term "throttle sensor reading," as used herein, broadly includes any sensor reading in the vehicle that is provided by a sensor—either directly or indirectly via some other component, device, module, system, etc.—and is representative of a torque request. The torque request may come from the driver (e.g., via the accelerator pedal) or, in some cases, by a component, device, module, system, etc. in the vehicle (e.g., via some automated vehicle stability control process). In either case, the throttle sensor reading is generally representative of a torque request. For example, throttle sensor 32 may provide sensor readings to control module 40 that constitute throttle sensor readings. The sensor readings that are gathered and used in this step are representative of torque request demands on the vehicle that can impact the electrode mode status. Thus, step 130 evaluates these throttle sensor readings and determines how much of the total electric mode range should be allocated to them. According to the exemplary embodiment shown in FIG. 2, step 130 may include three separate sub-steps 132-138.

Step 132 determines a maximum torque available (MTA), which is generally representative of the maximum amount of torque that vehicle 10 can produce, at that time, in the electric mode. The MTA can be impacted or influenced by a number of different factors, and may be determined during vehicle design and manufacture, during vehicle operation using various operating parameters (e.g., parameters involving battery, motor and/or engine capabilities), or determined in some other way. Thus, the MTA may be a static value that does not change, or a dynamic one that varies with the current operation of the vehicle. In one embodiment, the MTA represents an instantaneous maximum torque available and is stored in electronic memory device 70.

Next, step 134 determines a current torque request (CTR), which is generally representative of the amount of torque that is being requested of the vehicle at that time. In one embodiment, when a driver engages the accelerator pedal, throttle sensor 32 sends a throttle sensor reading to control module 40 that may be used to determine the CTR value. In another embodiment, an engine control module (ECM) or the like may send a throttle sensor reading to control module 40 that may be used to determine the CTR value. Step 134 is not limited to the preceding examples, as the CTR may be acquired in any number of different ways.

Step 136 then determines a torque request percentage (TRP) by dividing current torque request (CTR) by the maximum torque available (MTA). For example, if the driver depresses the accelerator pedal 25% (i.e., the accelerator pedal is pushed to a rotational position that is at the one quarter position of its total pedal travel), and the MTA corresponds to the 50% accelerator position, then this would generally result in a torque request percentage (TRP) of about 50%. Put differently, the driver is requesting approximately 50% of the total electric propulsion torque that is available. Skilled artisans will appreciate that other factors may impact this calculation, as the TRP may or may not be calculated simply by evaluating pedal position. Now that a torque request percentage (TRP) has been determined, the method can use this to arrive at a second gauge allocation for vehicle gauge 42.

Step 138 uses the torque request percentage (TRP) to determine the second gauge allocation for vehicle gauge 42. This may be performed in any number of different ways, including the following exemplary embodiment where the second gauge allocation is determined as follows:

Second Gauge Allocation=[(100%−First Gauge Allocation)*Torque Request Percentage (TRP)]

Thus, the second gauge allocation may be influenced by the first gauge allocation previously determined in step 120. Continuing with the previous example, assume that the first gauge allocation for the non-throttle conditions was 40% (30% for vehicle speed and 10% for SOC); this leaves 60% of the total angular range 202 that is now available for throttle conditions or torque requests. Because the driver in this example is requesting 50% of the available torque (i.e., a TRP of 50%) and there is only 60% of the electric mode range left, then step 138 determines that the second gauge allocation is 30% (((100%−40%)*50%)=30%). If the step 120 had determined that the first gauge allocation was 0% (i.e., there were no non-throttle conditions that impacted the electric mode) and the TRP is still 50%, then the second gauge allocation would be 50% (((100%−0%)*50%)=50%). It should be appreciated that any combination of steps 120-138 can be combined or arranged according to some other order, as FIG. 2 is simply meant to illustrate one exemplary possibility.

Now that the first and second gauge allocations have been determined, step 140 can add them together to determine a total gauge allocation. With reference to FIG. 5, the combination of arrows 220 and 222 represents the first gauge allocation (40% in the previous example), and arrow 224 represents the second gauge allocation (30% in the previous example). Thus, step 140 can add arrows 220, 222 and 224 together to arrive at a total gauge allocation of 70%, which is indicated by indicator 204. Skilled artisans will appreciate that by expressing the total gauge allocation in terms of a percentage, fraction or portion, as opposed to an absolute position, the total gauge allocation may be applied to any number of different gauges and gauge types.

Figure 6:
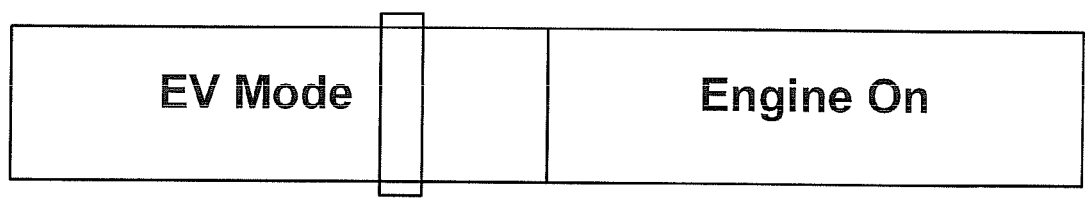
Figure 7:
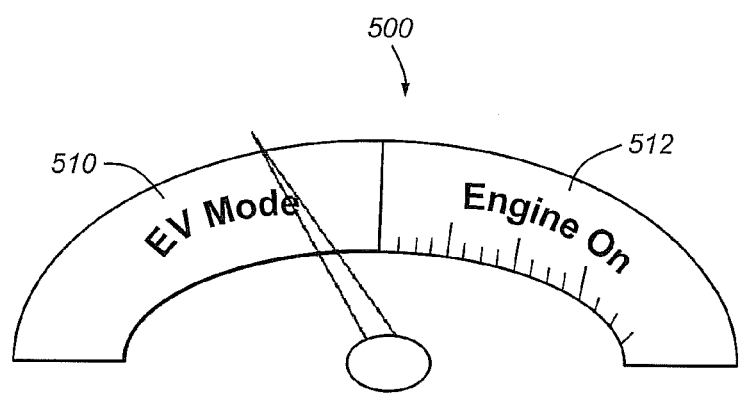

Step 150 uses the total gauge allocation to determine a gauge position for the specific vehicle gauge in question. Even if the total gauge allocation is the same for two different gauges, the gauge position may vary depending on the particular design and arrangement of the gauge. For example, vehicle gauge 42 in FIG. 5 has an arcuate sweep with a total angular range 202 of about 90°, but the total gauge allocation may be applied to vehicle gauges having an angular range of 180° or 360°, for example. Step 150 adapts or applies the total gauge allocation to the particular gauge in question and, according to the example illustrated in FIG. 5, it multiples a total gauge allocation of 70% by the total angular range 202 of 90° to arrive at position of indicator 204 that is illustrated therein. It is also possible to apply the total gauge allocation to other gauges, such as linear gauges or the like, including ones that do not have an angular range at all. Some examples of such gauges are shown in FIGS. 6-7 and are meant to illustrate other potential vehicle gauges having an electric mode status of about 70%. Of course other embodiments are possible, for instance, the vehicle gauge may display a digital value instead of a pointer-type indicator. In another embodiment, a pointer and a digital display are both used to display the current electric mode status of the vehicle.

Step 160 then displays the electric mode status of the vehicle to the driver via vehicle gauge 42. This step may use any combination of known signal processing techniques, including filtering, before sending a command signal from control module 40 to vehicle gauge 42. For example, step 160 may filter the gauge position data to avoid erratic changes in the position of indicator 204 (e.g., applying a moving average to the gauge position data). In one embodiment, a small time delay can be used to settle down the motion of a display pointer. As the driver engages the accelerator pedal, indicator 204 will change position to reflect the changes in their torque requests. This may enable the drive to control or modify their acceleration so that vehicle 10 remains in an electric mode for a greater amount of time, thereby increasing the overall fuel economy of the vehicle.

Turning to FIG. 7, there is shown an exemplary vehicle gauge 500 that includes an electric mode portion 510 and an engine mode portion 512. The electric mode portion 510 may operate as described above so that it displays the electric mode status to the driver. However, once the vehicle transitions to an engine mode (e.g., by a non-customer activated engine start), then the engine mode portion 512 may operate according to a standard tachometer which displays the engine speed to the driver. Other features, designs, configuration, etc. are possible, as vehicle gauge 500 only represents one possible arrangement for displaying both electric mode and engine mode status to a driver.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of displaying an electric mode status of a vehicle that can operate in an electric mode and at least one alternative mode of operation, comprising the steps of:
    (a) receiving a non-throttle sensor reading from a non-throttle sensor and using the non-throttle sensor reading to determine a first gauge allocation for a vehicle gauge;
    (b) receiving a throttle sensor reading from a throttle sensor and using the throttle sensor reading to determine a second gauge allocation for the vehicle gauge;
    (c) using the first and second gauge allocations to determine the electric mode status of the vehicle; and
    (d) displaying the electric mode status of the vehicle with the vehicle gauge, wherein the vehicle gauge generally indicates how close the vehicle is to transitioning from the electric mode to the at least one alternative mode of operation.

2. The method of claim 1, further comprising the step of: receiving an engine status signal from an engine control module and using the engine status signal to determine if an engine is running, and only proceeding to steps (a)-(d) if the engine is not running.

3. The method of claim 1, wherein step (a) further comprises receiving a speed sensor reading from a speed sensor and using the speed sensor reading to determine a first gauge allocation for the vehicle gauge, wherein the speed sensor reading is a non-throttle sensor reading and is representative of the speed of the vehicle.

4. The method of claim 3, wherein step (a) further comprises using a look-up table to correlate the speed sensor reading to the first gauge allocation, wherein the look-up table includes a minimum speed threshold that corresponds to about 0% gauge allocation and a maximum speed threshold that corresponds to about 100% gauge allocation, at which point the vehicle automatically transitions from an electric mode to an alternative mode.

5. The method of claim 1, wherein step (a) further comprises receiving a battery sensor reading from a battery sensor and using the battery sensor reading to determine a first gauge allocation for the vehicle gauge, wherein the battery sensor reading is a non-throttle sensor reading and is representative of one or more battery conditions.

6. The method of claim 5, wherein step (a) further comprises using a look-up table to correlate the battery sensor reading to the first gauge allocation, wherein the look-up table includes a minimum state-of-charge (SOC) threshold that corresponds to about 100% gauge allocation, at which point the vehicle automatically transitions from an electric mode to an alternative mode, and a maximum state-of-charge (SOC) threshold that corresponds to about 0% gauge allocation.

7. The method of claim 1, wherein step (a) further comprises receiving a plurality of non-throttle sensor readings from a plurality of non-throttle sensors and using the plurality of non-throttle sensor readings to determine a plurality of gauge allocations, wherein the plurality of gauge of allocations are added together to determine the first gauge allocation which is representative of the overall non-throttle gauge allocation for the vehicle.

8. The method of claim 7, wherein the plurality of non-throttle sensor readings includes at least one sensor reading selected from the group consisting of: a speed sensor reading that is representative of vehicle speed, a battery sensor reading that is representative of a battery condition, and a temperature sensor reading that is representative of a vehicle component temperature.

9. A method of displaying an electric mode status of a vehicle that can operate in an electric mode and at least one alternative mode of operation:
(a) receiving a non-throttle sensor reading from a non-throttle sensor and using the non-throttle sensor reading to determine a first gauge allocation for a vehicle gauge;
(b) receiving a throttle sensor reading from a throttle sensor and using the throttle sensor reading to determine a second gauge allocation for the vehicle gauge;
(c) using the first and second gauge allocations to determine the electric mode status of the vehicle; and
(d) displaying the electric mode status of the vehicle with the vehicle gauge, wherein step (b) further comprises determining a maximum torque available (MTA) and a current torque request (CTR), and dividing the CTR by the MTA to determine a torque request percentage (TRP), wherein the TRP is used to determine the second gauge allocation for the vehicle gauge.

10. The method of claim 9, wherein the current torque request (CTR) is determined by receiving a throttle sensor reading from a throttle sensor that is coupled to an accelerator pedal.

11. The method of claim 9, wherein the second gauge allocation is determined according to the equation:

Second Gauge Allocation=[(100%−First Gauge Allocation)*Torque Request Percentage (TRP)].

12. The method of claim 1, wherein step (c) further comprises adding the first and second gauge allocations together to determine a total gauge allocation that is representative of the electric mode status of the vehicle.

13. The method of claim 12, wherein step (c) further comprises multiplying the total gauge allocation by a total angular range in order to determine an actual gauge position that is representative of the electric mode status of the vehicle.

14. The method of claim 1, wherein step (d) further comprises sending a command signal from a control module to the vehicle gauge, and using the command signal to control the vehicle gauge so that it displays the electric mode status of the vehicle.

15. A method of displaying an electric mode status of a vehicle that can operate in an electric mode and an engine mode, comprising the steps of:
(a) receiving a battery sensor reading from a battery sensor that is coupled to a high-voltage battery used for vehicle propulsion and using the battery sensor reading to determine a first gauge allocation for the vehicle gauge, wherein the first gauge allocation is influenced by the amount of charge on the high-voltage battery;
(b) receiving a throttle sensor reading from a throttle sensor that is coupled to an accelerator pedal and using the throttle sensor reading to determine a second gauge allocation for the vehicle gauge, wherein the second gauge allocation is influenced by the amount of torque requested by the driver;
(c) adding the first and second gauge allocations together to determine a total gauge allocation, wherein the total gauge allocation generally indicates how close the vehicle is to transitioning from the electric mode to the engine mode; and
(d) controlling the vehicle gauge with a command signal that is generated using the total gauge allocation.

16. A vehicle gauge for displaying an electric mode status of a vehicle that can operate in an electric mode and at least one alternative mode of operation, comprising:
a first end representing the beginning of an electric mode range;
a second end representing the end of the electric mode range and the beginning of the at least one alternative mode of operation;
a total range extending from the first end to the second end; and
an indicator moving between the first end and the second end along the total range, wherein the position of the indicator indicates the electric mode status of the vehicle by showing how close the vehicle is to transitioning from the electric mode to the at least one alternative mode of operation.

17. The vehicle gauge of claim 16, further comprising:
an electric mode portion; and
an engine mode portion, wherein the electric mode portion displays the electric mode status of the vehicle and the engine mode portion displays the engine mode status of the vehicle.

* * * * *